UNITED STATES PATENT OFFICE.

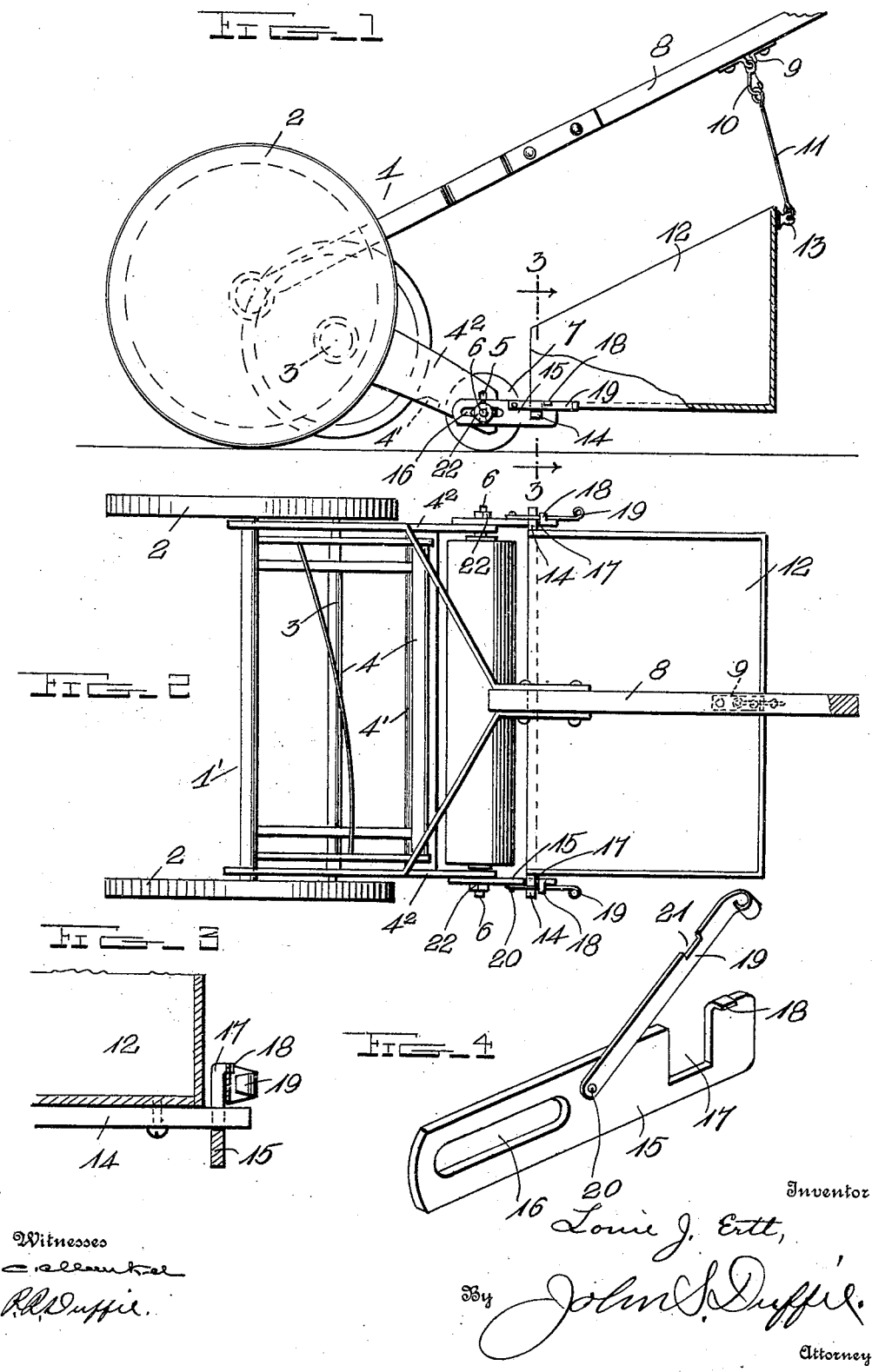

LOUIE J. ERTL, OF NEBRASKA CITY, NEBRASKA.

LAWN-MOWER.

No. 930,058.　　　Specification of Letters Patent.　　　Patented Aug. 3, 1909.

Application filed March 16, 1909.　Serial No. 483,678.

*To all whom it may concern:*

Be it known that I, LOUIE J. ERTL, a citizen of the United States of America, residing at Nebraska City, in the county of Otoe and State of Nebraska, have invented certain new and useful Improvements in Lawn-Mowers, of which the following is a specification.

My invention has relation to lawn mowers, and to that particular class which has a basket attached thereto for the reception of grass or other growth as the same is being cut.

The main object of my invention is to produce a clamp of such construction that the basket of the lawn mower may be readily removed at will so that the same might be emptied.

By the use of my clamp a basket may be attached to any lawn mower of the class illustrated in the accompanying drawings, or if there happens to be no roller in the mower, then all that will be necessary is to drill a hole on each side of said mower and bolts passed therethrough, said bolts passing through the slots in said clamps.

With these and other objects in view my invention consists of the novel construction and arrangement of parts as are described in the following specification, illustrated in the accompanying drawings, and particularly pointed out in the claims hereunto appended.

Reference being had to the drawing:—Figure 1 is a side elevation of a lawn mower with a grass catcher in position, shown partly in section, held in position by the use of my clamp. Fig. 2 is a plan view thereof. Fig. 3 is a detail, vertical sectional view, taken on the line 3—3 of Fig. 1. Fig. 4 is a detail, perspective view of my clamp for holding said basket in position.

Referring more particularly to the accompanying drawings, my invention is described as follows:—

The lawn mower 1, is mounted on the wheels 2, also provided with the transverse rod 3, upon which is mounted a series of cutting blades 4, co-acting with the stationary knife blade $4^1$, mounted upon plates $4^2$. Pivotally connected at each end of said rod 3, is the plate $4^2$, the outer ends of which are provided with vertical slots 5. Journaled between said plates $4^2$, and mounted on the bearing 6, is a roller 7, the ends of said bearing passing through said slots of the plates $4^2$.

Pivotally connected to the rod $1^1$, in the usual manner is the handle bar 8, provided on its under face near its outer end with an eyed plate 9, provided with a common harness snap 10, to which is connected the connecting rod 11, either end of which is provided with a loop.

The basket 12, provided on the outer surface of its rear wall near its top edge with a perforated ear 13, is also provided with a transverse rod 14 having a rectangular cross-section.

The clamp 15, has near one end an elongated slot 16, and at its other end a vertical recess 17, at one corner of which is a lug 18. A spring-rod 19, is pivotally connected at one of its ends 20, to said clamp at or near its center, and is provided with a recess 21, in its upper edge near its outer end, said lug 18, fitting into said recess 21, when said spring-rod is in its normal position.

When the grass catcher is in position, the clamps are secured to the outer ends of the rod 6, against the outer faces of the plates $4^2$, by means of nuts 22. It is obvious that the clamps are adapted to be adjusted on said rod 6, by loosening the nuts 22. The rod 14, has its outer ends inserted into said recess 17, then spring-rod 19, is placed in such a position that said lug 18, will engage the same, fitting into the recess 21. The connecting rod has its lower end connected to the perforated ear 13, its upper end snapped into the snap-hook 10.

When it is desired to remove the basket, the upper end of the rod 11, is disengaged from the snap-hook 10; the spring-arm 19, is disengaged from the lug 18, thus allowing said transverse rod 14, to be removed from engagement with said clamps.

Though I have specifically described my invention I may exercise the right to make such modifications or alterations in the construction thereof as will not depart from the spirit of my claims.

Having described my invention, what I claim as new and desire to secure by Letters Patent is:—

1. In a lawn mower, clamps adapted to be adjustably secured to said lawn mower, each of said clamps having near one end an elongated slot and near its other end a vertical recess, a lug formed at one corner of said recess, a spring-arm pivotally secured to said clamp near the center thereof, said spring-arm adapted to engage said lug.

2. In a lawn mower, a grass catcher, a transverse rod secured to said grass catcher at its lower front edge, a perforated ear secured to said basket at its upper rear edge, a clamp secured to the lawn mower, said clamp having near one end an elongated slot and provided near its other end with a vertical recess, a lug formed at one corner of said recess, a spring-arm pivotally connected to said clamp at its center, said spring-arm provided with a recess in its upper edge near its outer end, said transverse rod adapted to fit into said vertical recess, said spring-arm engaged by said lug when the transverse rod is in position, said perforated ear having connected thereto a connecting rod, said connecting rod further connected to the handle bar of said lawn mower, substantially as described.

In testimony whereof I affix my signature in presence of two witnesses.

LOUIE J. ERTL.

Witnesses:
FRANK J. CARMODY,
F. B. ECCLESTON.